(12) United States Patent
Fan et al.

(10) Patent No.: US 8,231,505 B2
(45) Date of Patent: Jul. 31, 2012

(54) ELECTROMAGNETIC ACTUATION SYSTEM WITH FORCE FEEDBACK CONTROL USING PIEZOELECTRIC RING

(75) Inventors: Hsing Hua Fan, Rochester Hills, MI (US); Timothy M. Burns, Elbridge, NY (US)

(73) Assignee: Magna Powertrain of America, Inc., Troy, MI (US)

( * ) Notice: Subject to any disclaimer, the term of this patent is extended or adjusted under 35 U.S.C. 154(b) by 249 days.

(21) Appl. No.: 12/786,678

(22) Filed: May 25, 2010

(65) Prior Publication Data

US 2011/0290611 A1    Dec. 1, 2011

(51) Int. Cl.
*B60W 10/02* (2006.01)
*F16D 25/12* (2006.01)

(52) U.S. Cl. ..................................... 477/175; 192/30 W

(58) Field of Classification Search ................ 477/175; 192/30 W, 84.91, 84.93; 701/67
See application file for complete search history.

(56) References Cited

U.S. PATENT DOCUMENTS

| | | | |
|---|---|---|---|
| 6,607,061 B2 * | 8/2003 | Hori et al. | 192/84.91 |
| 6,883,658 B2 * | 4/2005 | Reul et al. | 192/98 |
| 7,357,748 B2 * | 4/2008 | Kelley, Jr. | 475/231 |

* cited by examiner

*Primary Examiner* — Dirk Wright
(74) *Attorney, Agent, or Firm* — Harness, Dickey & Pierce, P.L.C.

(57) ABSTRACT

A torque transfer device for a motor vehicle includes a clutch for transferring torque between first and second shafts. An electromagnetic actuator includes an axially moveable armature for applying an application force to the clutch. An actuator control system includes a force sensor positioned within a clutch actuation force load path and is operable to output a signal indicative of a force applied to the clutch. The control system includes a controller operable to control the electromagnetic actuator to vary the force applied to the clutch based on the force sensor signal.

20 Claims, 5 Drawing Sheets

ELECTROMAGNETIC ACTUATION SYSTEM WITH FORCE FEEDBACK CONTROL USING PIEZOELECTRIC RING

FIELD

The present disclosure relates generally to power transfer systems for controlling the distribution of drive torque between the front and rear drivelines of a four-wheel drive vehicle and/or the left and right wheel of an axle assembly. More particularly, the present disclosure is directed to a control system for an electromagnetic clutch actuator used in motor vehicle driveline applications.

BACKGROUND

In many vehicles, a power transmission device is operably installed between the primary and secondary drivelines. Such power transmission devices are typically equipped with a torque transfer mechanism which is operable for selectively and/or automatically transferring drive torque from the primary driveline to the secondary driveline to establish a four-wheel drive mode of operation.

A modern trend in four-wheel drive motor vehicles is to equip the power transmission device with a transfer clutch and an electronically-controlled traction control system. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch plate assembly. The clutch actuator typically includes a power-operated device that is actuated in response to electric control signals sent from an electronic controller unit (ECU). Variable control of the electric control signal is frequently based on changes in the current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

A large number of on-demand power transmissions have been developed which utilize an electrically-controlled clutch actuator for regulating the amount of drive torque transferred through the clutch assembly to the secondary driveline as a function of the value of the electrical control signal applied thereto. In some applications, the transfer clutch employs an electromagnet as the power-operated clutch actuator. For example, U.S. Pat. No. 5,407,024 discloses an electromagnetic coil that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic clutch actuator for directly controlling actuation of the multi-plate clutch pack assembly.

As an alternative, the transfer clutch may employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

While many on-demand clutch control systems similar to those described above are currently used in four-wheel drive vehicles, the cost and complexity of such systems may become excessive. In addition, control of the clutch actuation components may be challenging based on size, cost and power limitations imposed by the vehicle manufacturer. In an effort to address these concerns, simplified torque couplings are being considered for use in these applications.

SUMMARY

This section provides a general summary of the disclosure, and is not a comprehensive disclosure of its full scope or all of its features.

A torque transfer device for a motor vehicle includes a clutch for transferring torque between first and second shafts. An electromagnetic actuator includes an axially moveable armature for applying an application force to the clutch. An actuator control system includes a force sensor positioned within a clutch actuation force load path and is operable to output a signal indicative of a force applied to the clutch. The control system includes a controller operable to control the electromagnetic actuator to vary the force applied to the clutch based on the force sensor signal. Furthermore, a torque transfer device for a motor vehicle includes a clutch for transferring torque between first and second shafts. An electromagnetic actuator includes an axially moveable armature for applying an application force to the clutch. An actuator control system includes a force sensor operable to output a signal indicative of a force applied to the clutch. The control system determines a target torque to be transferred by the clutch and a target application force based on the target torque. The control system is operable to vary an electrical input to the electromagnetic actuator to perform closed loop control of the force applied to the clutch.

A method of controlling an electromagnetic actuator for a clutch transferring torque between first and second shafts of a power transmission device in a vehicle includes determining vehicle operating characteristics. A target clutch torque is determined based on the vehicle operating characteristics. A target clutch actuation force is determined based on the target torque. An actual clutch actuation force is determined based on a signal provided by a force sensor positioned within a clutch actuation force load path. The method determines whether the actual clutch actuation force is within a predetermined tolerance of the target clutch actuation force. Closed loop force feedback control is performed by varying an electrical input to the electromagnetic actuator to control the clutch actuation force based on the force sensor signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The present disclosure is directed to a torque transfer mechanism that can be adaptively controlled to transfer torque between a first rotary member and a second rotary member. The torque transfer mechanism finds particular application in power transmission devices for use in motor vehicle drivelines such as, for example, a clutch in a transfer case or an in-line torque coupling or a disconnect associated with a differential unit in a transfer case or a drive axle assembly. Thus, while the present disclosure is hereinafter described in association with particular arrangements for use in specific driveline applications, it will be understood that the arrangements shown and described are merely intended to illustrate different applications of the present disclosure.

Figure 1:
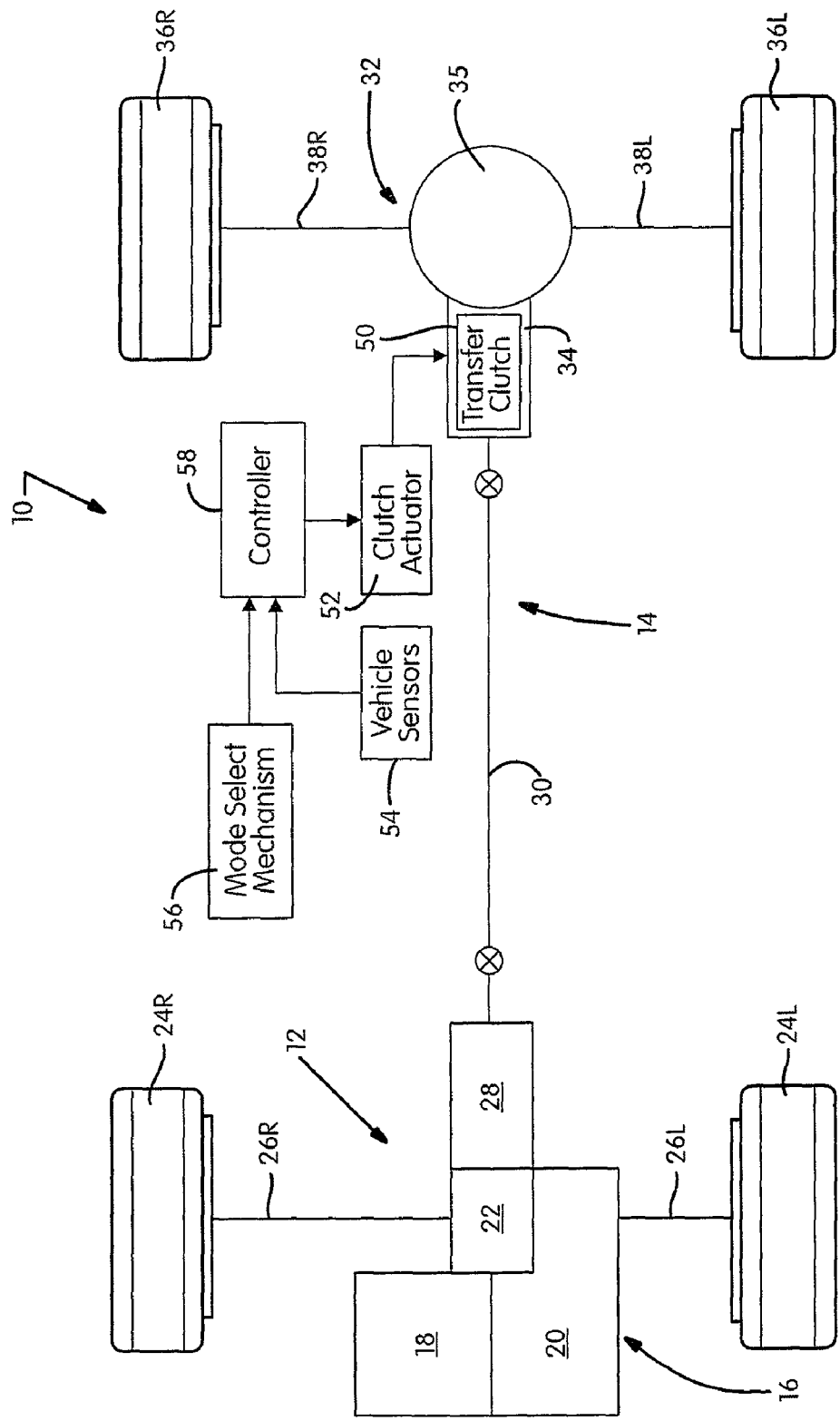
FIG. 1 is a schematic of an exemplary vehicle equipped with a torque coupling of the present disclosure.

With particular reference to FIG. 1 of the drawings, a drivetrain 10 for an all-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the front driveline while secondary driveline 14 is the rear driveline. Powertrain 16 is shown to include an engine 18 and a multi-speed transmission 20. Front driveline 12 includes a front differential 22 driven by powertrain 16 for transmitting drive torque to a pair of front wheels 24L and 24R through a pair of front axleshafts 26L and 26R, respectively. Rear driveline 14 includes a power transfer unit 28 driven by powertrain 16 or differential 22, a propshaft 30 driven by power transfer unit 28, a rear axle assembly 32 and a power transmission device 34 for selectively transferring drive torque from propshaft 30 to rear axle assembly 32. Rear axle assembly 32 is shown to include a rear differential 35, a pair of rear wheels 36L and 36R and a pair of rear axleshafts 38L and 38R that interconnect rear differential 35 to corresponding rear wheels 36L and 36R.

With continued reference to the drawings, drivetrain 10 is shown to further include an electronically-controlled power transfer system for permitting a vehicle operator to select a two-wheel drive mode, a locked ("part-time") four-wheel drive mode or an "on-demand" mode. In this regard, power transmission device 34 is equipped with a transfer clutch 50 that can be selectively actuated for transferring drive torque from propshaft 30 to rear axle assembly 32 for establishing the part-time and on-demand four-wheel drive modes. The power transfer system further includes a power-operated clutch actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of clutch actuator 52 in response to input signals from vehicle sensors 54 and mode select mechanism 56.

Figure 2:
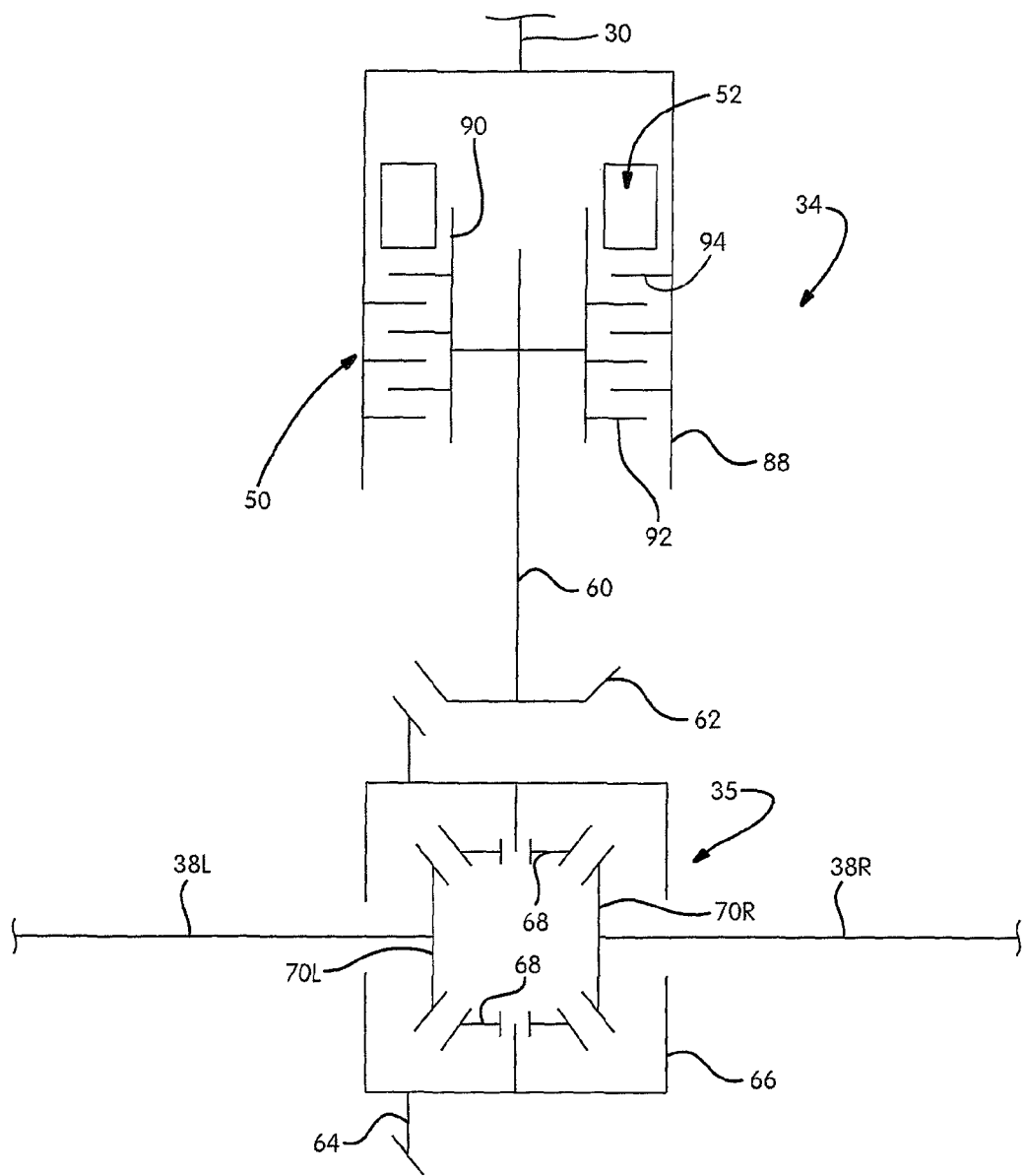
FIG. 2 is a schematic illustration of the torque coupling shown in FIG. 1 associated with a drive axle assembly.

Power transmission device 34, hereinafter referred to as torque coupling 34, is shown schematically in FIG. 2 to be operably disposed between propshaft 30 and a pinion shaft 60. As seen, pinion shaft 60 includes a pinion gear 62 that is meshed with a hypoid ring gear 64 that is fixed to a differential case 66 of rear differential 35. Differential 35 is conventional in that pinions 68 driven by case 66 are arranged to drive side gears 70L and 70R which are fixed for rotation with corresponding axleshafts 38L and 38R. Torque coupling 34 is shown to include transfer clutch 50 and clutch actuator 52 arranged to control the transfer of drive torque from propshaft 30 to pinion shaft 60 and which together define the torque transfer mechanism of the present disclosure.

Figure 3:
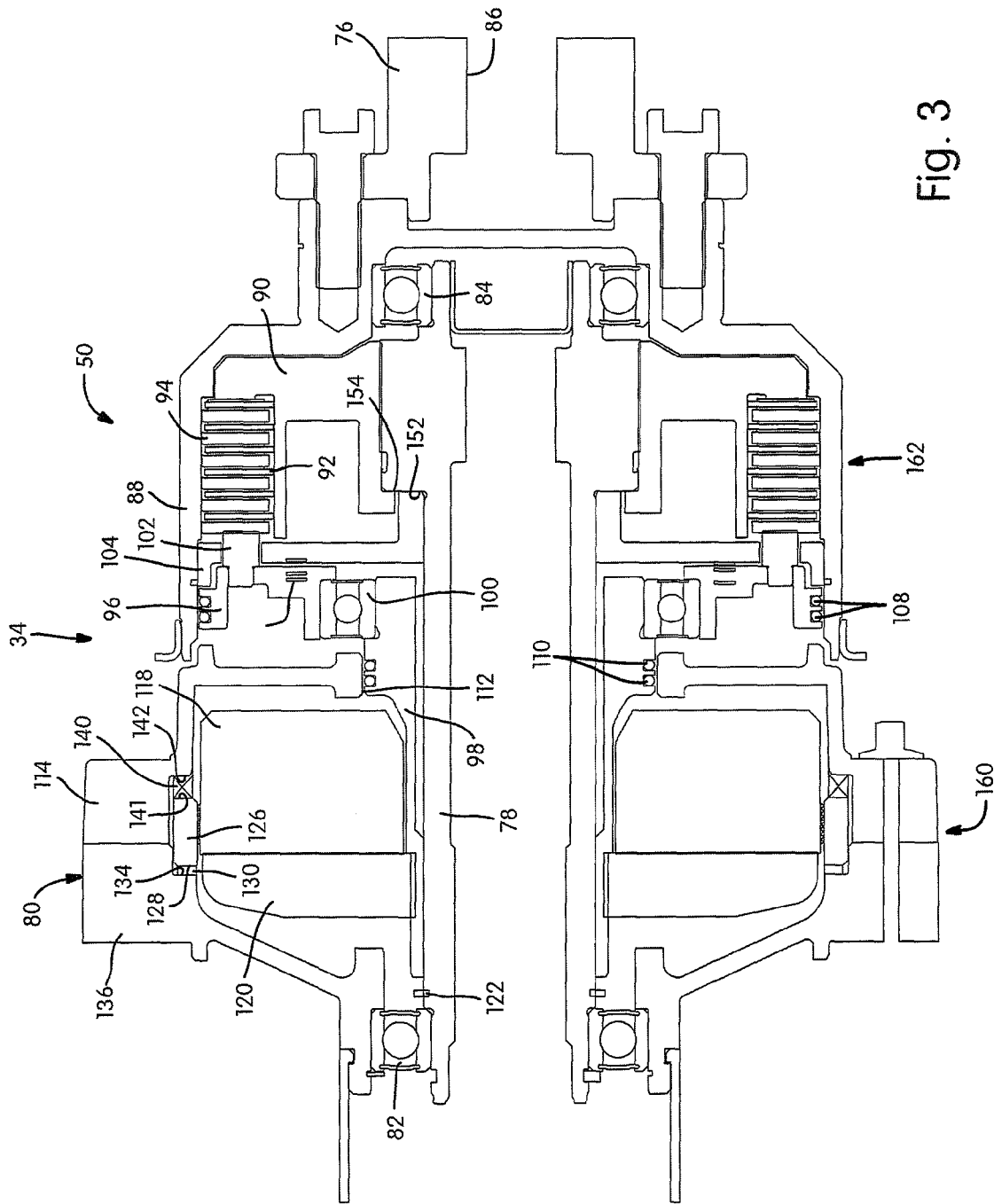
FIG. 3 is a sectional view of the torque coupling.

Referring primarily to FIG. 3, the components and function of torque coupling 34 will be disclosed in detail. As seen, torque coupling 34 generally includes a rotary input shaft 76 and a rotary output shaft 78 supported for rotation relative to one another within a housing 80 by a bearing 82. Another bearing 84 supports rotary output shaft 78. Rotary input shaft 76 is fixed for rotation with propshaft 30. Rotary output shaft 78 is fixed for rotation with pinion shaft 60 via a spline 86.

Transfer clutch 50 includes a drum 88 fixed for rotation with rotary input shaft 76. A hub 90 is fixed for rotation with rotary output shaft 78. A plurality of inner clutch plates 92 are fixed for rotation with hub 90. A plurality of outer clutch plates 94 are fixed for rotation with drum 88. Inner and outer clutch plates 92, 94 are interleaved with one another. An apply plate 96 is rotatably supported on an apply tube 98 by a bearing 100. Bearing 100 is captured such that apply plate 96, bearing 100 and apply tube 98 translate as a unit. A plurality of circumferentially spaced apart pins 102 extend through a support plate 104 that is fixed to drum 88. A return spring 106 is positioned between support plate 104 and apply plate 96 to bias apply plate 96 toward a first or returned positioned. It should be appreciated that pins 102 may be integrally formed with apply plate as a monolithic, one-piece component. At the returned position, pins 102 do not apply the compressive force to inner and outer clutch plates 92, 94. Seals 108 are provided between apply plate 96 and drum 88 to resist ingress of contaminants to the inner volume of drum 88 containing inner clutch plates 92 and outer clutch plates 94. Another pair of seals 110 are provided between apply tube 98 and a bore 112 extending through a first or front portion 114 of housing 80.

Clutch actuator 52 includes a stator 118 positioned within housing 80. An axially moveable armature 120 is fixed to apply tube 98 and positioned in close proximity to stator 118. Return spring 106 biases apply tube 98 and armature 120 away from stator 118. Travel of apply tube 98 is limited by a retaining ring 122. It should be appreciated that apply tube 98 is axially and rotatably moveable relative to rotary output shaft 78 and that armature 120, stator 118, apply tube 98 and housing 80 do not rotate during operation of transfer clutch 50. An adjustment ring 126 is threadingly engaged with stator 118 to vary the position of an end face 128 of adjustment ring 126. A piezoelectric ring 130 is positioned between end face 128 and a land 134 of a second or rear portion 136 of housing 80. A biasing spring 140 acts on an end face 141 of adjustment ring 126 opposite end face 128. Spring 140 engages a seat 142 formed on first portion 114. Spring 140 biases stator 118 and adjustment ring 126 toward second housing portion 136. At initial assembly, adjustment ring 126 is rotated relative to stator 118 to assure that spring 140 applies a predetermined compressive load to adjustment ring 126, piezoelectric ring 130 and second housing portion 136. In this manner, adjustment ring 126 is operable to account for variants in component tolerances. It should be appreciated that adjustment ring 126 may be eliminated and a shim may be added during assembly to account for dimensional variation.

Second housing portion 136 rotatably supports rotary output shaft 78 via bearing 82. Bearing 82 is coupled in such a manner that rotary output shaft 78 is restricted from axial movement relative to second housing portion 136.

Armature 120, apply tube 98, bearing 100, apply plate 96 and pins 102 are axially moveable from a retracted position to an advanced position where pins 102 compress inner clutch plates 92 and outer clutch plates 94 together to transfer torque across transfer clutch 50. Armature 120 is drawn toward stator 118 when current is passed through stator 118. Furthermore, controller 58 is in electrical communication with stator 118. Torque coupling 34 may be operated in a torque transferring mode by passing current through stator 118 in response to a command from controller 58.

An actuator control system includes controller 58, vehicle sensors 54 and piezoelectric ring 130. Piezoelectric ring 130 is placed within the load path generated during electrical excitation of stator 118. The load path created during the transfer of torque across transfer clutch 50 includes stator 118, adjustment ring 126, piezoelectric ring 130, second housing portion 136, bearing 82, rotary output shaft 78, hub 90, inner and outer clutch plates 92, 94, pins 102, apply plate 96, bearing 100, apply tube 98 and armature 120. The load path between hub 90 and rotary output shaft 78 includes an enlarged stepped diameter portion 152 of rotary output shaft 78 engaging a radially inward extending flange 154 of hub 90. Piezoelectric ring 130 is operable to output a signal indicative of the compressive force between adjustment ring 126 and second housing portion 136. The position of piezoelectric ring 130 is merely exemplary. For example, it is contemplated that piezoelectric ring 130 may be alternatively integrated into other components including stator 118, adjustment ring 126, rear housing portion 136, or the interconnection between bearing 82 and rear housing portion 136. The piezoelectric sensor may reside at nearly any location within the stationary portion of transfer clutch 50 as previously described. Furthermore, separate piezoelectric elements may be circumferentially spaced apart in lieu of using piezoelectric ring 130.

Based on the arrangement of components previously described, it should be appreciated that a first subassembly 160 may be defined as including housing 80, apply tube 98, stator 118, armature 120, spring 140, adjustment ring 126, and piezoelectric ring 130. Subassembly 160 may be assembled at a location separate from the assembly location of the other components of transfer clutch 50. Entry of contaminants within housing 80 may be minimized during the assembly process and during functional use of transfer clutch 50. Another subassembly 162 may be defined to include drum 88, hub 90, inner and outer clutch plates 92, 94, rotary output shaft 78, bearing 84, support plate 104, pins 102 and apply plate 96. Through the use of subassemblies 160, 162, a heat generated through the frictional interconnection of inner clutch plates 92 and outer clutch plates 94 may be readily transferred to drum 88. Drum 88 is positioned in communication with the atmosphere to facilitate heat rejection from transfer clutch 50. Furthermore, subassembly 160 is separate from and spaced apart from subassembly 162 to shield electromagnetic actuator 52 from the heat generated by transfer clutch 50. It is contemplated that more accurate clutch control may be achieved by maintaining a relatively constant temperature of stator 118 throughout operation of torque coupling 34.

Figure 4:
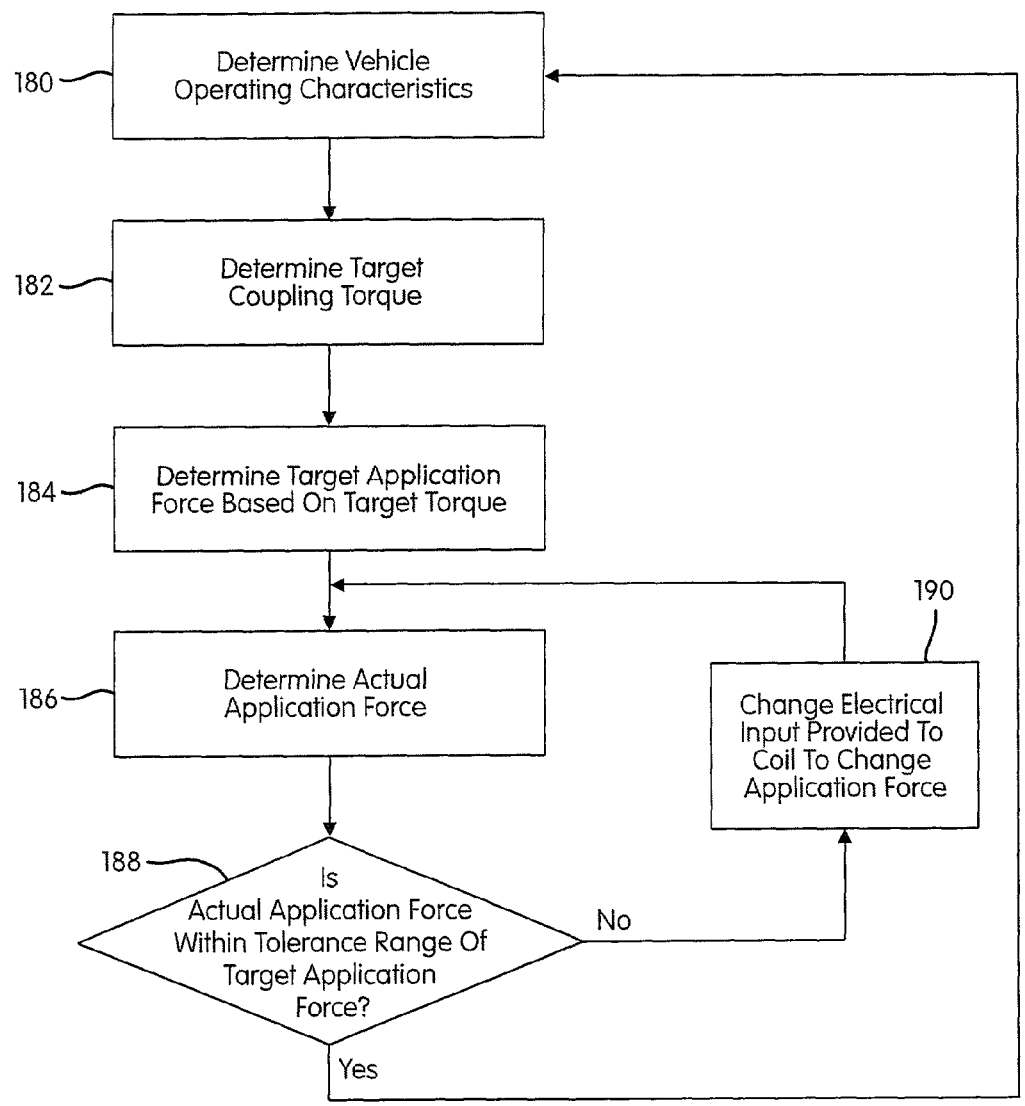
FIG. 4 is a flow diagram relating to an actuator control system.

FIG. 4 provides a logic flow diagram relating to the control of torque coupling 34. At block 180, vehicle sensors 54 provide signals indicative of driver inputs and various vehicle operating characteristics to controller 58. The signals may indicate vehicle speed, individual wheel speeds, transmission gear ratio, steering angle, engine speed, throttle position, ambient temperature, and slip speed between input shaft 76 and output shaft 78 among other vehicle characteristics. At block 182, a target torque to be transferred across torque coupling 34 is determined based upon the vehicle operating characteristics and driver inputs. The target torque may include a magnitude of zero torque where torque transfer across torque coupling 34 is not desired.

At block 184, a target clutch application force is determined based on the target torque determined at block 182. Controller 58 may be programmed with or have access to a look-up table or may execute an algorithm of a previously determined relationship between application force and coupling torque. It is contemplated that the clutch actuation force vs. torque trace may be empirically generated by applying a number of different electrical inputs having various magnitudes to stator 118. The resulting application force and torque relationship is saved in the look-up table.

At block 186, an actual clutch application force is determined based on the output of piezoelectric ring 130. At block 188, the actual application force is compared to the target application force. If the actual application force is within a predetermined tolerance range of the target application force, control returns to block 180. If the actual application force is outside of the tolerance range of the target application force position, controller 58 varies an electrical input to stator 118 to change the application force in an attempt to meet the target application force. Control returns to block 186 where the new application force is compared to the target application force. Closed loop position control continues until the conditions of block 188 have been met.

Figure 5:
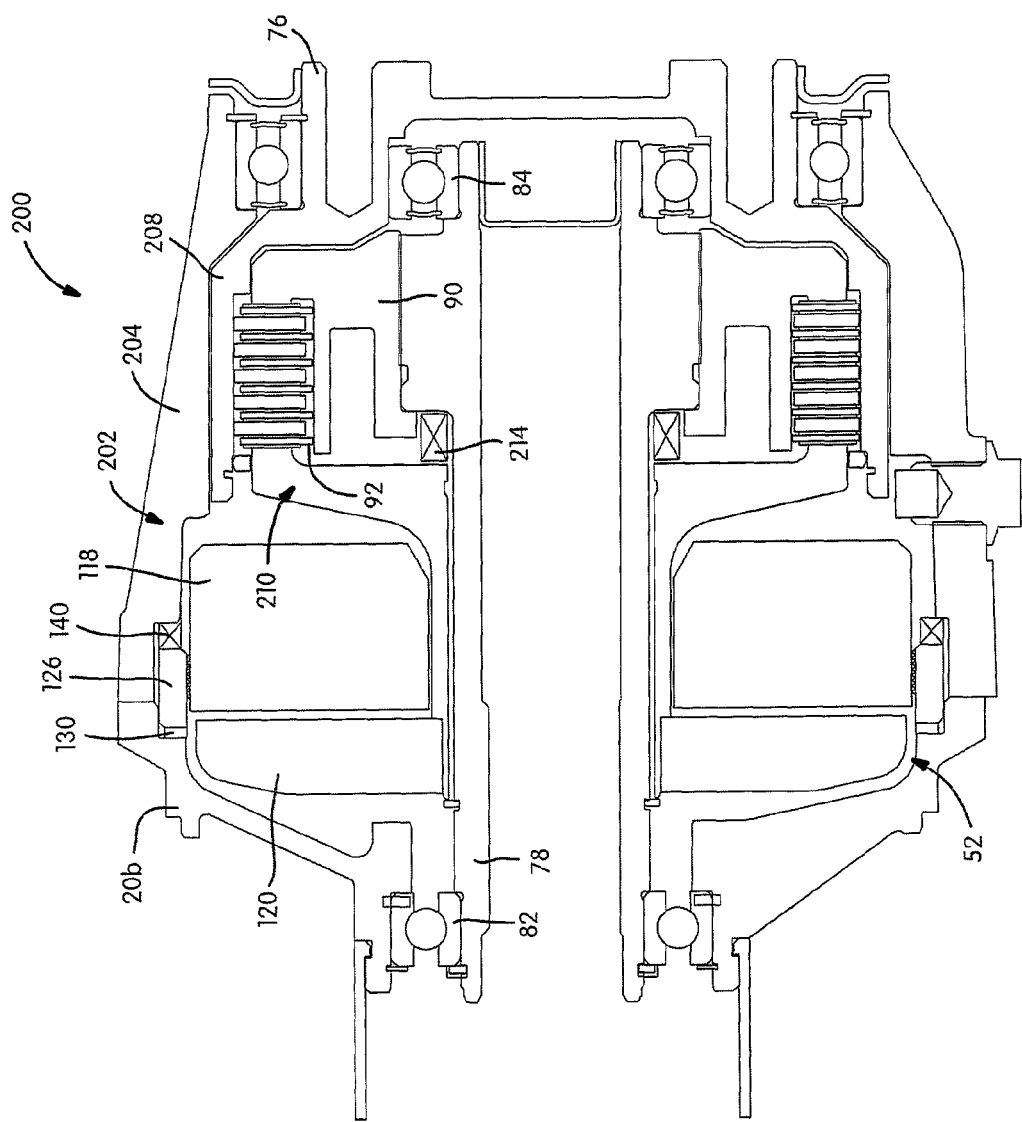
FIG. 5 is a sectional view of an alternate torque coupling.

FIG. 5 depicts an alternate torque coupling 200. Torque coupling 200 is substantially similar to torque coupling 34. Accordingly, similar elements will be identified with like reference numerals. Furthermore, due to the similarities between the couplings, only the differences will be highlighted. Torque coupling 200 includes a housing 202 including a first portion 204 fixed to a second portion 206. A drum 208 is supported for rotation and positioned within housing 202. Rotary input shaft 76 is integrally formed with drum 208. An apply plate 210 is fixed for rotation with and is axially moveable relative to rotary output shaft 78. Armature 120 is fixed to apply plate 210. Accordingly, rotary output shaft 78, armature 120, apply plate 210, inner clutch plates 92 and hub 90 rotate and translate at the same speed. A return spring 214 urges apply plate 210 and armature 120 toward their retracted position. Piezoelectric ring 130 remains in the load path as previously described in relation to torque coupling 34. Closed loop feedback control may be achieved based on the force applied by electromagnetic actuator 52 and indicated by piezoelectric ring 130 as previously described in relation to torque coupling 34.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A torque transfer device for a motor vehicle, comprising:
a first shaft;

a second shaft;

a clutch for transferring torque between the first and second shafts;

an electromagnetic actuator including an axially moveable armature for applying an application force to the clutch; and an actuator control system including a force sensor operable to output a signal indicative of a force applied to the clutch, the control system determining a target torque to be transferred by the clutch and a target application force based on the target torque, the control system being operable to vary an electrical input to the electromagnetic actuator to perform closed loop control of the force applied to the clutch.

2. The torque transfer device of claim 1 wherein the force sensor includes a piezoelectric element.

3. The torque transfer device of claim 1 wherein the force sensor is coupled to a stator of the electromagnetic actuator.

4. The torque transfer device of claim 1 wherein the force sensor is positioned within a load path between a housing containing the clutch and a stator of the electromagnetic actuator.

5. The torque transfer device of claim 1 wherein the target torque is determined by evaluating vehicle operating characteristics including vehicle speed and throttle position.

6. The torque transfer device of claim 1 wherein the armature is fixed for rotation with one of the first and second shafts.

7. The torque transfer device of claim 1 wherein the armature does not rotate with either of the first and second shafts.

8. The torque transfer device of claim 1 wherein the force sensor includes a piezoelectric ring.

9. The torque transfer device of claim 1 wherein the force sensor is positioned within a clutch application force load path that includes one of the first and second shafts.

10. The torque transfer device of claim 1 wherein the force sensor is spaced apart from and positioned radially outboard of the armature.

11. The torque transfer device of claim 1 wherein the actuator includes a housing containing a stator and the armature, the clutch including a drum positioned outside of the housing.

12. A torque transfer device for a motor vehicle, comprising:

a first shaft;
a second shaft;
a clutch for transferring torque between the first and second shafts;
an electromagnetic actuator including an axially moveable armature for applying an application force to the clutch; and
an actuator control system including a force sensor positioned within a clutch actuation force load path and operable to output a signal indicative of a force applied to the clutch, the control system including a controller operable to control the electromagnetic actuator to vary the force applied to the clutch based on the force sensor signal.

13. The torque transfer device of claim 12 wherein the force sensor includes a piezoelectric element.

14. The torque transfer device of claim 13 wherein the sensor includes a ring shape surrounding one of the first and second shafts.

15. The torque transfer device of claim 12 wherein the force sensor is coupled to a stator of the electromagnetic actuator.

16. The torque transfer device of claim 15 wherein the stator is axially moveable within a housing containing the armature.

17. The torque transfer device of claim 16 further including a spring biasing the stator into contact with the force sensor.

18. The torque transfer device of claim 12 wherein the force sensor is positioned within a load path between a housing containing the clutch and a stator of the electromagnetic actuator.

19. A method of controlling an electromagnetic actuator for a clutch transferring torque between first and second shafts of a power transmission device in a vehicle, the method comprising:

determining vehicle operating characteristics;
determining a target clutch torque based on the vehicle operating characteristics;
determining a target clutch actuation force based on the target torque;
determining an actual clutch actuation force based on a signal provided by a force sensor positioned within a clutch actuation force load path;
determining whether the actual clutch actuation force is within a predetermined tolerance of the target clutch actuation force; and
performing closed loop force feedback control by varying an electrical input to the electromagnetic actuator to control the clutch actuation force based on the force sensor signal.

20. The method of claim 19 further including storing torque vs. clutch actuation force information during clutch testing prior to installation of the clutch within the vehicle, wherein the target clutch actuation force determination is based on the information.

* * * * *